US011726173B2

(12) United States Patent
Sheriff et al.

(10) Patent No.: US 11,726,173 B2
(45) Date of Patent: Aug. 15, 2023

(54) ATTACK DETECTION AND MITIGATION FOR FINE TIMING MEASUREMENT

(71) Applicant: Cisco Technology, Inc., San Jose, CA (US)

(72) Inventors: Akram I. Sheriff, San Jose, CA (US);
Jerome Henry, Pittsboro, NC (US);
Robert E. Barton, Richmond (CA);
Pooya Monajemi, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 605 days.

(21) Appl. No.: 16/880,797

(22) Filed: May 21, 2020

(65) Prior Publication Data
US 2021/0364597 A1 Nov. 25, 2021

(51) Int. Cl.
*G01S 7/36* (2006.01)
*G01S 13/76* (2006.01)
*H04W 12/00* (2021.01)

(52) U.S. Cl.
CPC .............. *G01S 7/36* (2013.01); *G01S 13/762* (2013.01); *G01S 13/765* (2013.01); *H04W 12/00* (2013.01)

(58) Field of Classification Search
CPC ..... H04W 12/00; H04W 4/02; H04W 56/001; G01S 13/762
USPC .......................................................... 726/4
See application file for complete search history.

(56) References Cited

U.S. PATENT DOCUMENTS

| | | | | |
|---|---|---|---|---|
| 9,591,493 | B2* | 3/2017 | Gutierrez | H04B 7/0689 |
| 9,674,814 | B2* | 6/2017 | Aldana | H04W 64/006 |
| 9,907,047 | B1* | 2/2018 | Vamaraju | H04W 4/23 |
| 10,082,557 | B1* | 9/2018 | Chu | H04W 40/244 |
| 2016/0366606 | A1* | 12/2016 | Steiner | G01S 13/765 |
| 2018/0310194 | A1* | 10/2018 | Yang | H04W 24/10 |
| 2018/0332053 | A1 | 11/2018 | Weis et al. | |
| 2018/0335514 | A1* | 11/2018 | Dees | G01S 7/36 |
| 2020/0260313 | A1* | 8/2020 | Yang | H04W 56/00 |

OTHER PUBLICATIONS

Jerome Henry "Fingerprinting Using Fine Timing Measurement," MobiWac '19, Nov. 25-29, 2019, 8 pages.
H. Ahmadi and R. Bouallegue. 2017. Exploiting machine learning strategies and RSSI for localization in wireless sensor networks: A survey. In 2017 13th International Wireless Communications and Mobile Computing Conference (IWCMC). 1150-1154. https://doi.org/10.1109/IWCMC.2017.7986447.

(Continued)

*Primary Examiner* — Teshome Hailu
(74) *Attorney, Agent, or Firm* — Patterson + Sheridan, LLP (57) ABSTRACT

Embodiments for securing fine timing measurement (FTM) communications are described. FTM communications include FTM frames sent and received from an initiating station (ISTA) and a responding station (RSTA). The RSTA records a plurality of parameters associated with the FTM frames and uses the plurality of parameters to learn and identify a device profile for the ISTA. The device profile is used to determine a behavior filter for the FTM from the ISTA and the RSTA filters FTM traffic according to the behavior filter to prevent malicious attacks in the FTM communications.

20 Claims, 6 Drawing Sheets

(56) References Cited

OTHER PUBLICATIONS

K. D. Yüksel and B. U. Töreyin. 2018. A deep learning and RSSI based approach for indoor positioning. In 2018 26th Signal Processing and Communications Applications Conference (SIU). 1-4. https://doi.org/10.1109/SIU.2018.8404614.

Mathieu Cunche. 2013.1 I knowyourMAC Address: Targeted tracking of individual using Wi-Fi. Journal of Computer Virology and Hacking Techniques 10 (Nov. 2013), 219-227. https://doi.org/10.1007/s11416-013-0196-1.

Mathy Vanhoef, Célestin Matte, Mathieu Cunche, Leonardo S. Cardoso, and Frank Piessens. 2016. Why MAC Address Randomization is Not Enough: An Analysis of Wi-Fi Network Discovery Mechanisms. In Proceedings of the 11th ACM on Asia Conference on Computer and Communications Security (ASIA CCS '16). ACM, Mew York, NY, USA, 413-424. https://doi.org/10.1145/2897845.2897883.

\* cited by examiner

ATTACK DETECTION AND MITIGATION FOR FINE TIMING MEASUREMENT

The following disclosure(s) are submitted under 35 U.S.C. 102(b)(1)(A): "Fingerprinting Using Fine Timing Measurement," Jerome Henry, Nicolas Montavont, MobiWac '19, November 25-29, 2019, Miami Beach, Fla., USA.

TECHNICAL FIELD

Embodiments presented in this disclosure generally relate to malicious actors attempting to interrupt Fine Timing Measurement (FTM) communications between network devices. More specifically, embodiments include using learned device characteristics and behavior to determine expected communication behavior patterns and filter out communications that do not match the expected behavior patterns.

BACKGROUND

FTM is a technique which an initiating station (e.g., a connected client device) can exchange messages with a responding station (e.g., an access point) to perform ranging measurements based on various parameters associated with the exchanged methods. Malicious actors using man-in-the-middle attacks can cause errors in the FTM process which result in network latency and network security problems.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method which includes recording, at a receiving device, a plurality of parameters associated with fine timing measurement (FTM) frames received at the receiving device from a sending device and FTM frames sent to the sending device from the receiving device. The method also includes identifying, using the recorded plurality of parameters, a device profile for the sending device may include at least a chipset type, an operating system (OS), and OS traffic schedule variations, determining, using the device profile, a behavior filter for FTM traffic from the sending device, and filtering FTM traffic from the sending device according to the behavior filter. Other embodiments of this aspect include corresponding computer systems, apparatus, and computer programs recorded on one or more computer storage devices, each configured to perform the actions of the methods.

One example embodiment includes a system which includes one or more computer processors and a memory containing a program which when executed by the computer processors performs an operation. The operation includes recording, at a receiving device, a plurality of parameters associated with fine timing measurement (FTM) frames received at the receiving device from a sending device and FTM frames sent to the sending device from the receiving device and identifying, using the recorded plurality of parameters, a device profile for the sending device may include at least a chipset type, an operating system (OS), and OS traffic schedule variations. The operation also includes determining, using the device profile, a behavior filter for FTM traffic from the sending device and filtering FTM traffic from the sending device according to the behavior filter.

Another example embodiment includes a computer-readable storage medium having computer-readable program code embodied therewith, the computer-readable program code executable by one or more computer processors to perform an operation. The operation includes recording, at a receiving device, a plurality of parameters associated with fine timing measurement (FTM) frames received at the receiving device from a sending device and FTM frames sent to the sending device from the receiving device and identifying, using the recorded plurality of parameters, a device profile for the sending device may include at least a chipset type, an operating system (OS), and OS traffic schedule variations. The operation also includes determining, using the device profile, a behavior filter for FTM traffic from the sending device and filtering FTM traffic from the sending device according to the behavior filter.

Example Embodiments

FTM is a technique included in Institute of Electrical and Electronics Engineers (IEEE) 802.11 protocols by which an initiating station (ISTA) which is typically a client device, exchanges messages/frames with a responding station (RSTA), typically an access point AP, to perform ranging measurements based on information in FTM exchanges. The result of multiple such measurements allows the ISTA to evaluate its relative position to one or more RSTAs and determine a location for the ISTA within given geographic area such as a location within a building, etc. FTM and location determination of an ISTA can be useful in providing location information to users of the ISTA and other location based applications that may utilize the location of the ISTA such as navigation applications, among others.

Moreover, FTM is essential to the implementation of deterministic communication methods such as 802.1 Time Sensitive networking (TSN) into Wi-Fi. In many examples, latency-sensitive applications using TSN require strict latency-measurements to wireless clients. For example, ensuring accurate location information and expected travel time of messages enable more specific and accurate performance of deterministic networking methods. Malicious behavior, such as man-in-the-middle (MITM) attacks, in such latency sensitive TSN adversely affect client devices (such as internet-of-things (IOT) devices) that are connected in the network and can cause network failure or and damage to devices in the network when subject to MITM attacks.

However, current implementations of FTM in Wi-Fi networks are not secured or protected. The lack of guaranteed secure communications in FTM exchanges results in conditions where FTM exchanges may be interrupted. For example, a MITM station may disrupt an FTM exchange between an ISTA and an RSTA during a FTM exchange. Additionally, a MITM station may also impersonate an RSTA and return false measurements to the ISTA (e.g., attempting location confusion or drift). Furthermore, a station may impersonate a valid ISTA and disrupt an FTM exchange by sending improper requests to the AP. Each of these examples may cause network communication latency and failure as well as failure in determining accurate locations for the various stations in the network.

The systems and methods described herein provide for determining an active behavior filter to negate the effect of a FTM disruption and detecting FTM disruption attempts. For example, the methods may include recording a plurality of parameters associated with FTM frames sent and received at an RSTA and ISTA during a FTM exchange, identifying a device profile for the ISTA, determining, using the device profile, a behavior filter for FTM traffic from the sending device, and filtering FTM traffic from the ISTA including malicious MITM traffic according to the behavior filter.

Figure 1:
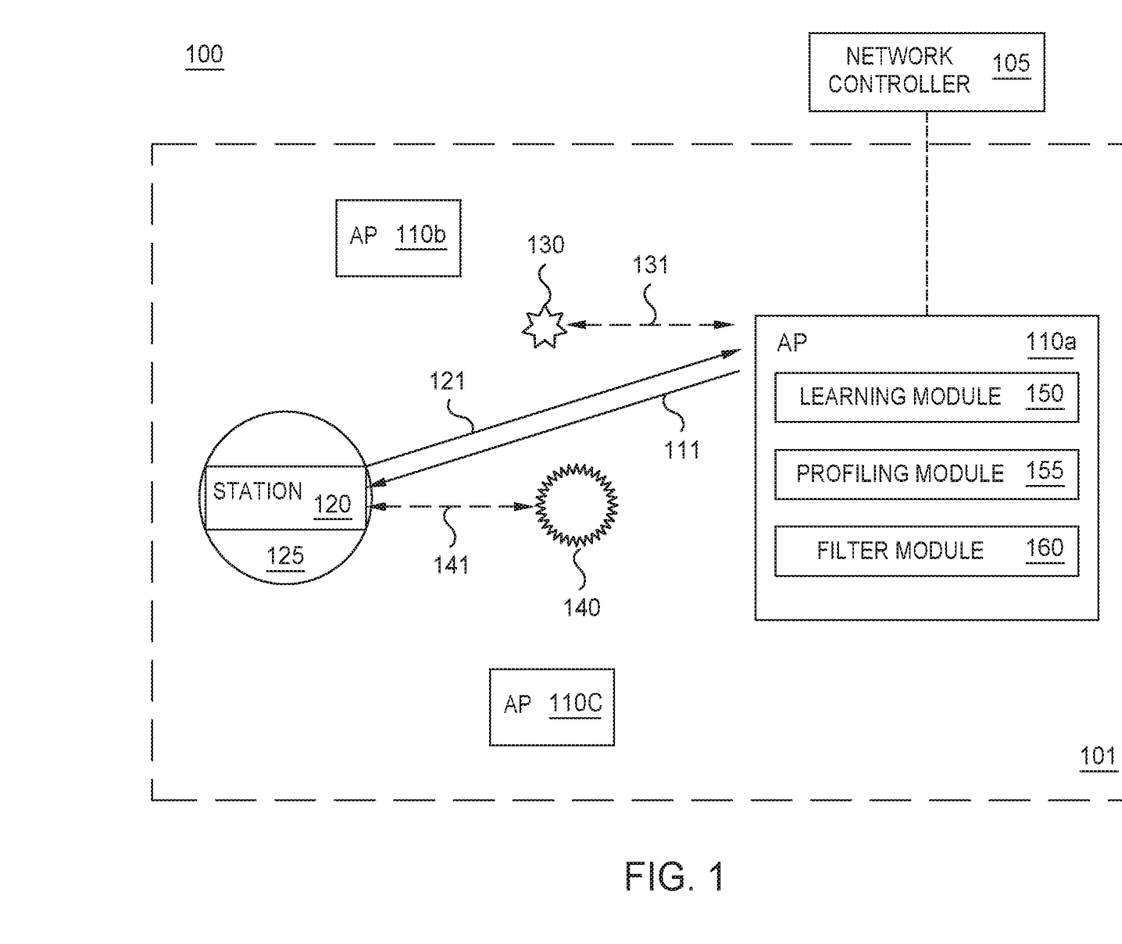
FIG. 1 illustrates a network, according to one embodiment described herein.

FIG. 1 illustrates a network 100, according to one embodiment described herein. The network 100 includes a deployment of APs under management by a network controller 105. The network controller 105 controls or manages a plurality of APs including APs 110a-c, collectively referred to as AP 110, (among other APs not shown in FIG. 1). While the various embodiments described herein are described in relation to FTM communications to and from the AP 110a, the systems and methods may also be performed by the other APs (APs 110a-c) and the network controller 105. The network controller 105 provides control and network access to the AP 110. The network access may include access to both internal networks (e.g., an intranet) and external networks (e.g., the Internet, wide area networks, etc.). The AP 110, in turn, provides network access to devices within the network 100 such as a station 120.

The station 120 may include any device (e.g., a client device, mobile device, etc.) with a network interface capable of connecting to the AP 110. In some examples, the AP 110 interacts with the station 120 to provide FTM exchanges such that the station 120 may determine its location, such as location 125, within an area 101 associated with the network 100. The area 101 may be within a building or other geographic area where various APs of the network 100 are capable of providing network access. The efficient determination of the location 125 allows for the station 120 to determine and guarantee deterministic networking capabilities among other network performance indicators and location based application capabilities.

In some examples, the station 120, as an ISTA, transmits FTM frames 121 to the AP 110. The AP 110, as an RSTA, transmits FTM frames 111 back to the station 120 during an FTM exchange. In some examples, a MITM station 130 may mimic a valid ISTA and transmit malicious frames 131 attempting to identify itself as a valid ISTA such as the station 120. In other examples, a MITM RSTA 140 may mimic a valid RSTA such as the AP 110 and transmit malicious frames 141 to an ISTA such as the station 120. To prevent negative effects of the potential MITM attacks, the AP 110 includes a learning module 150, a profiling module 155, and a filter module 160 which enable the AP 110 to identify valid ISTAs within the network and filter out and prevent MITM attacks from the MITM devices such as the MITM station 130 and MITM RSTA 140.

Figure 2:
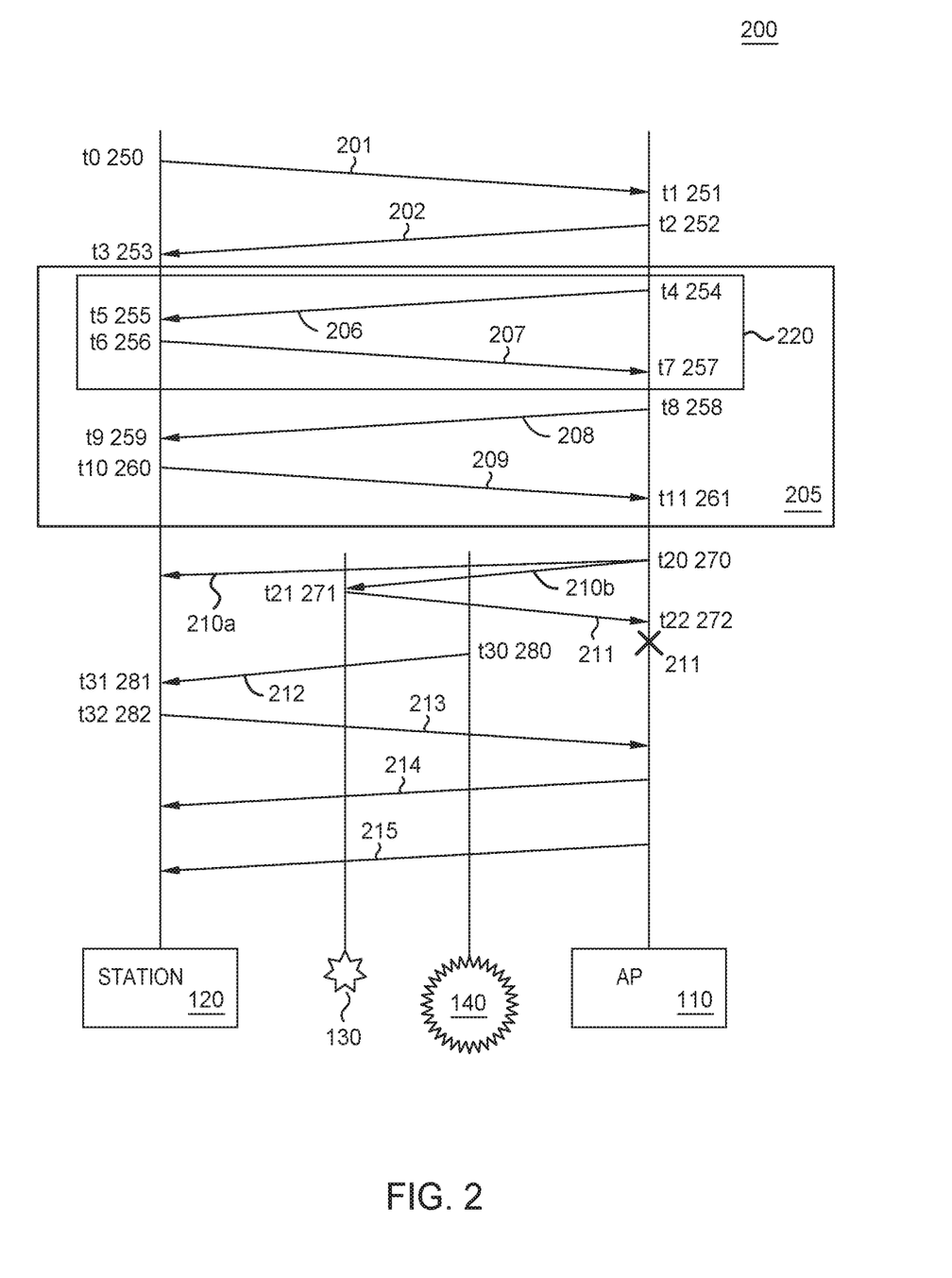
FIG. 2 illustrates FTM exchanges, according to embodiments described herein.

FIG. 2 illustrates FTM exchanges, according to embodiments described herein. As described above, during an FTM exchange an ISTA exchanges various messages or frames with a RSTA to perform ranging measurements. FTM exchange 200 begins with an ISTA (herein the station 120) sending an initial FTM request frame 201 indicating a FTM exchange is desired. In some examples, the initial FTM request frame 201 includes various parameters requested by the station 120, such as an exchange window (i.e. when the FTM (ranging) exchange should occur), and how many frames should be exchanged within that window (e.g., a burst size expressed in window time duration).

In response to the initial FTM request frame 201, the RSTA (herein the AP 110) may accept the parameters received in the initial FTM request frame 201 or override the proposed parameters with parameters determined by the AP 110. The AP 110 sends an acknowledgement (ACK) frame 202 to the station 120 to indicate the request frame 201 was received and an FTM frame 206 to begin an FTM burst 205. The station 120 responds to the FTM frame 206 with ACK frame 207 which completes one measurement pair 220. To accomplish the ranging calculation between the AP 110 and the station 120, each frame transmission between the station 120 and the AP 110 includes a known reception time and timestamp. The AP 110 includes various timestamps in the FTM frames sent from the AP 110. For example, the FTM frame 206 includes timestamps such as a time of departure (ToD) of the FTM frame 206 (e.g., time 4 (t4) 254). Subsequent FTM frames in the FTM burst 205 also include timestamps such as time of arrival (ToA) for the ACK frame 207 (e.g. t7 258) and ToD of the FTM frame 208 (e.g. t8 258). These various time parameters allow the station 120 to compute the time of flight of the various frames and therefore estimate its distance to the AP 110.

In some examples, one measurement pair 220 or one FTM burst 205 is usually not sufficient for proper ranging, thus the station 120 repeats the FTM exchange process several times for each RSTA against with which it is able to perform ranging communications (e.g., the APs 110a-c). In some examples, the AP 110 may also return its geographic location (LCI) in an FTM frame, which may further aid the station 120 to determine not only its relative distance to the AP, but also its absolute geographic location within the area 101 such as the location 125.

As discussed in FIG. 1, other stations may attempt to impersonate the station 120 and insert frames into the FTM exchange 200. For example, an FTM frame 210a sent from the AP 110 at t20 270 may be intercepted by the MITM station 130 as an FTM frame 210b. The MITM station 130 may send a MITM ACK frame 211 to the AP 110 to attempt to cause the AP 110 to send wrong FTM frames and determine wrong timestamps (e.g., t21 271 and t22 272) for the FTM exchange with the station 120. The result, without mitigating these attacks, may include overloading the AP 110 with too many requests or irrelevant frames causing a denial of service at the AP 110. This MITM attack may cause the station 120 to determine a wrong ranging or location and also cause the AP 110 to send the timestamps intended for the station 120 to the MITM station 130, thus allowing the attacker to follow the station 120 (i.e. the attacker may track, occasionally or continuously, the location of any ISTA in a public venue).

In another example, other devices or stations may impersonate the AP (RSTA) during the FTM exchange, to attempt to provide wrong ranging, wrong timestamps, or wrong LCI to the ISTA. For example, the MITM RSTA 140 may transmit MITM frame 212 at t30 280 to the station 120 attempting to act as the AP 110 including a MITM time t30 280. This in turn causes the station to record wrong times at t31 281 and t32 282 and may prevent the station 120 from determining its location, prevent an accurate calculation of a range to the AP 110, or cause the station 120 to determine a wrong location for its location.

In the context of IEEE 802.1 TSN for IOT use cases, these inaccuracies of time measurements potentially caused by MITM attacks would not only cause IOT applications to fail, but in industrial settings could cause physical damage to industrial communications equipment. Thus, the AP 110 includes the various mechanisms described herein to prevent these MITM attacks and secure the FTM exchanges.

With reference back to FIG. 1, the learning module 150 records various information about the station 120 and the AP 110 to determine a device profile for the station 120. For example, as the station 120 sends the frame 201 to the AP 110, the learning module 150 records a frame timestamp, the ToD t0 250, the ToA t1 251, a ToD error value, a ToA error value, and the burst window parameter values as indicated in the frame 201. As each communication or frame is sent and received at the AP 110, the additional ToA (e.g. t3 253, t5 255, t7 257, t9 259, and t11 261) and ToD values (e.g. t2 252, t4 252, t6 256, t8 258, and t10 260) for each frame including FTM frames sent from the AP 110 and ACK frames received from the station 120 are also recorded by the learning module 150.

Additional parameters may also be recorded by the learning module 150. For example, a frame signal strength such as a received signal strength indicator (RSSI) may also be recorded for each frame received at the AP 110. In some examples, a single FTM burst or exchange is insufficient to obtain accurate ranging for the station 120 such that the AP 110 repeats the cycle, e.g., FTM burst 205, several times. For each cycle, the various parameters described above are recorded, along with an interval between two cycles and other relevant parameters. In some examples, the learning module 150 stores the recorded plurality of parameters as learning model input data for use by a device profile such as the profiling module 155.

In some examples, the profiling module 155 uses the stored learning model input data identifies an ISTA chipset type and determines an expected pattern of the ISTA ranging activity (e.g., activity in the FTM exchanges). In some examples, an implementation of individual chipsets on different operating systems (OSes) results in specific and unique behaviors as observed in the FTM exchanges. For example, a first chipset running on a first OS system may display different signal characteristics from a second chipset running on second OS. The various parameters such as a time interval between individual FTM frames will be different for each chipset and OS. For example, a delay interval between receiving the FTM frame 206 at t5 255 and the transmission of the ACK frame 207 at t6 256 will vary for each different chipset and OS for an ISTA.

In some examples, a single dimensional comparison such as the above described delay interval, does not provide enough granular information to positively identify an ISTA. Therefore, the profiling module 155 utilizes all the parameters recorded in the learning model input data, to provide granular information in various behaviors observed from the ISTA. The granular information is then used to identify the ISTA along with expected FTM ranging frame typology.

In one example, the profiling module 155 uses an artificial neural network (ANN) which uses learning model input data for previously detected ISTAs to determine a profile for the station 120. In some examples, the profiling module 155 may also utilize a Long short-term Memory (LSTM) classifier to provide large scale training of multiple types of ISTAs at low computing cost outside of a learning period for the AP 110 and the station 120. The use of the LSTM classifier is suitable for computation at any distance from the radio frequency (RF) space (i.e. on the AP 110 itself for small scale uses, the network controller 105 for larger scale, or even on larger management systems for wider networks for very large scale learning). In some examples, the profiling module 155 divides learning model input data into sequences of training samples such as 200 training examples. In one example, the profiling module utilizes 2 fully connected LSTM layers (e.g., stacked on each other), with 64 units each to learn and produce reliable device profiles for various stations that may connect to the AP 110.

In some examples, the profiling module 155 classifies each parameter of the FTM exchange as a time-chunk series, which allows the profiling module 155 to determine fine or granular differences between ISTAs which are not visible or ascertained by strictly considering FTM frame content or various time intervals. For example, an ISTA may announce consecutive ToD values that may occur at strict intervals, but a drift in the ISTA clock may shows a particular delay between the ToD and the actual time of the frame (as recorded by the learning module 150).

By recognizing these particular behaviors and differences in FTM exchanges, the profiling module 155 recognizes different variations of the same chipset of an ISTA which may run on different OSes. For example, an OS interrupt cycle will influence the chipset low level behavior by injecting payloads at intervals characteristic of particular features of the individual OS. For example, an OS Scheduler and a network interface call from the OS for FTM will influence transmission behavior of the FTM exchanges. Furthermore, the OS scheduler for other Wi-Fi functions will also influence other frames (e.g., discovery frames etc.) and insertion of the other frames will impact FTM exchange behavior. As the various behaviors of individual ISTAs are learned, the various identifying aspects are used to classify and identify the station 120 according to a device profile for the station.

In some examples, when a particular unique station is first encountered by the AP 110 or another AP in the network 100, several FTM exchanges may be needed to provide enough learning data (e.g., recorded parameters) for granular identification and behavior data for the device including the chipset, OS, and various OS traffic scheduling variations. In another example, once the station 120 is profiled and learned, the station 120 may be identified after an initial burst based on the observed behaviors of the station 120. For example, as the station 120 sends its first bursts of FTM frames such as the frames 201 and 207, the profiling module 155, using the recorded parameters, determines a device profile for the station 120 and returns a behavioral filter for use by the filter module 160.

In some examples, the filter module 160 applies the behavior filter in an AP radio for the AP 110 to filter the FTM traffic. In some examples, the behavior filter is applied along with a filter such as an unscented Kalman filter (UKF) or an extended Kalman filter (EKF). For example, an EKF is used to profile expected behavior of an ISTA. In some examples, the EKF with the behavior profile includes a configurable tolerance value in the deviations from expected behavior, which allows the filter module 160 to tune the applied filter as necessary. With the application of the behavioral filter by the filter module 160, a potential attacker would need to be at an equivalent location as the attacked station or the AP (to get a same RSSI level), and also transmit within the same acceptable limits set by the filter (which values the attacker does not know), thus reducing the attack vectors and surfaces by which an attacker may attempt to penetrate FTM exchanges.

In some examples, the filter module 160 applying the behavioral filter acts as a MITM protection mechanism, based on the ISTA RSSI and the device profile returned by the profiling module 155. Any FTM frame that is injected by an attacker has to match exactly the frame pattern of the ISTA as well as the EKF or other Kalman filter to be accepted by the RSTA. Frames that are out-of-pattern and sent to the RSTA (the AP) are discarded and ignored, which allows the legitimate ISTA to continue its ranging exchanges without disruption. In some examples, when the attacker impersonates the AP and sends FTM frames to the ISTA, detection of such impersonation causes the AP to interrupt the local burst, to avoid the ISTA receiving invalid information that it believes came from the AP. The AP then offers another burst parameter via the FTM frames 214 and 215. Additionally, whenever a MITM attack is detected, the AP 110 also notifies a next level controller such as the network controller 105 to notify network management tools for network level mediation of the attacks. Additional steps for securing FTM communications are described in relation to FIGS. 3-5.

Figure 3:
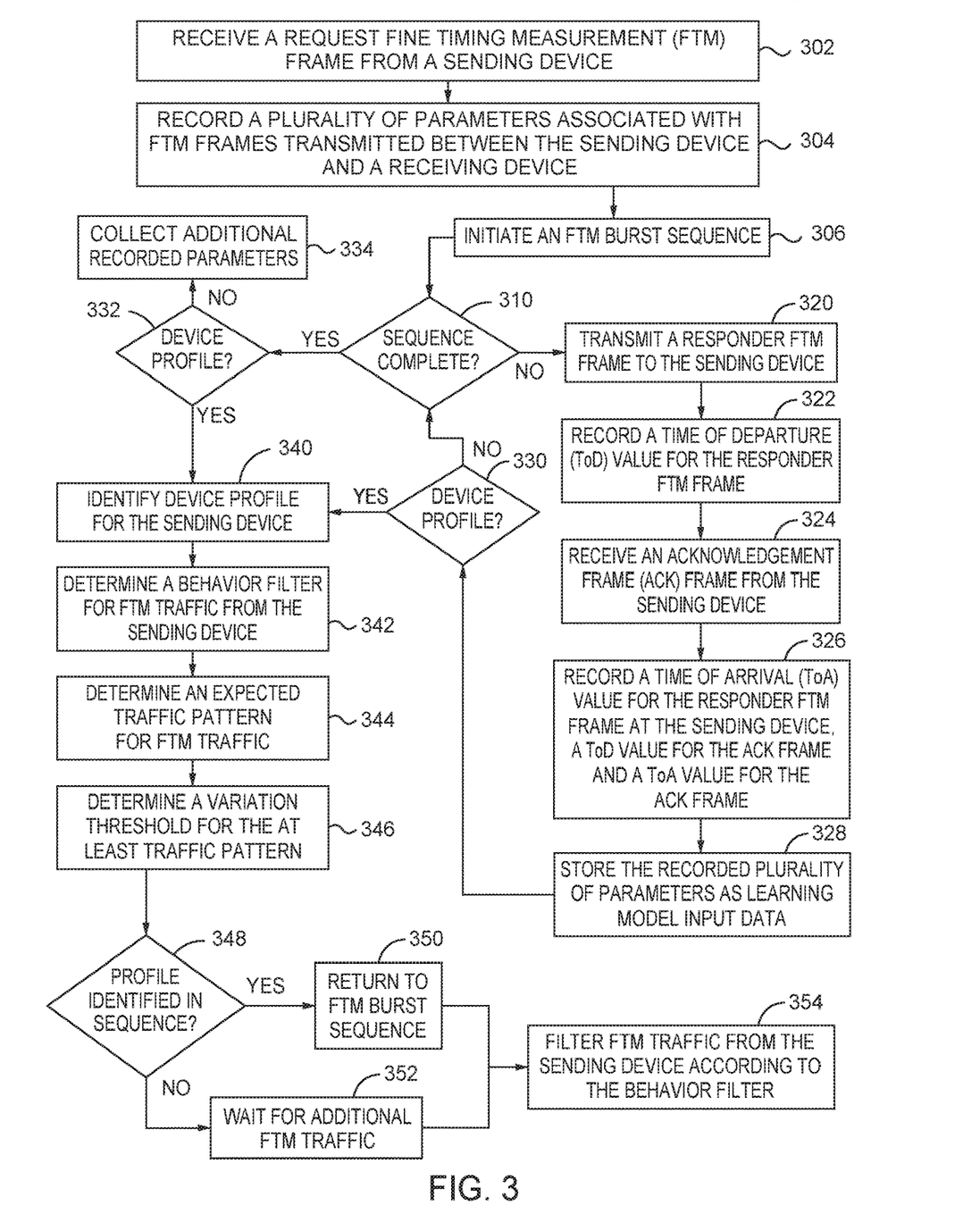
FIG. 3 is a method for FTM security in a network, according to one embodiment described herein.
Figure 4:
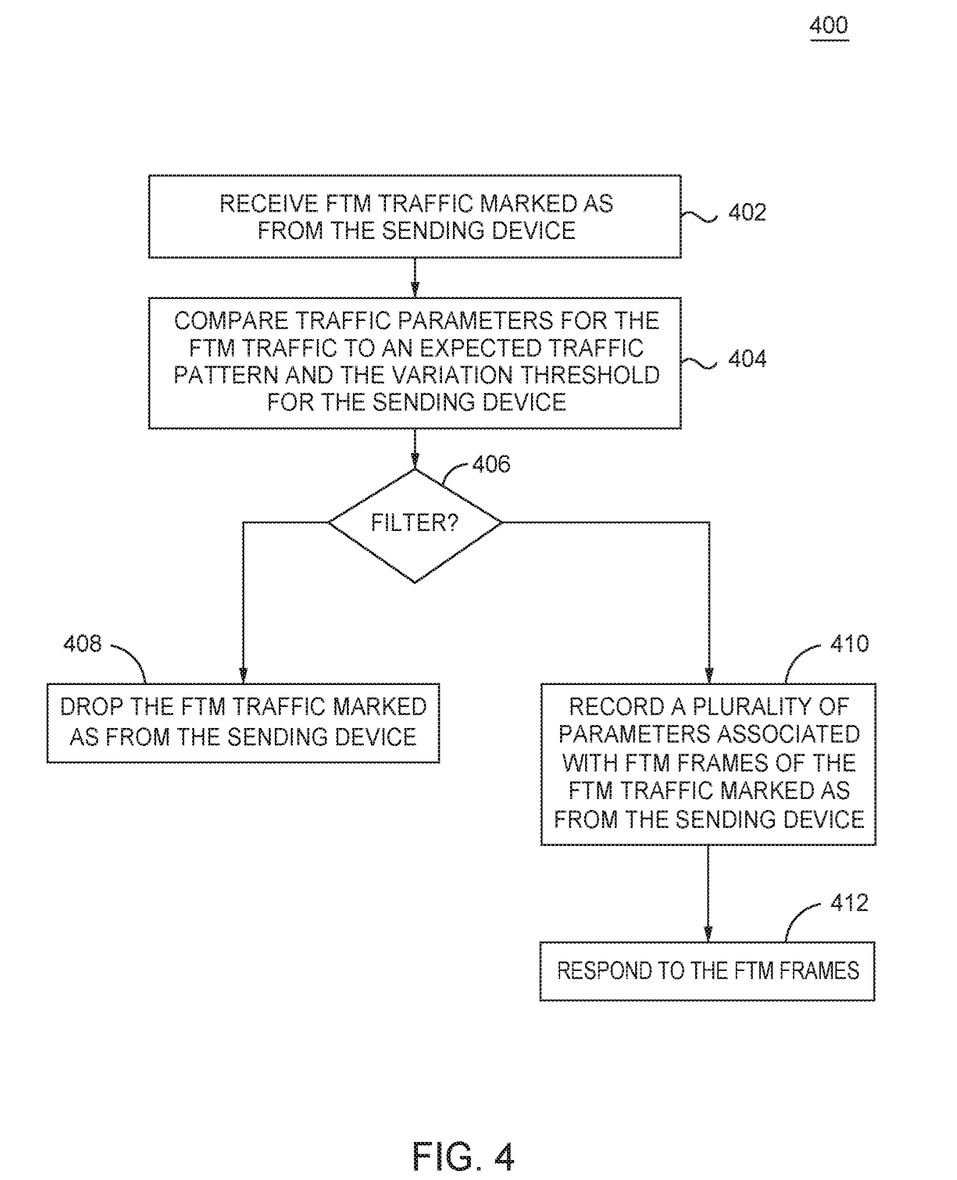
FIG. 4 is a method for FTM filtering in a network, according to one embodiment described herein.
Figure 5:
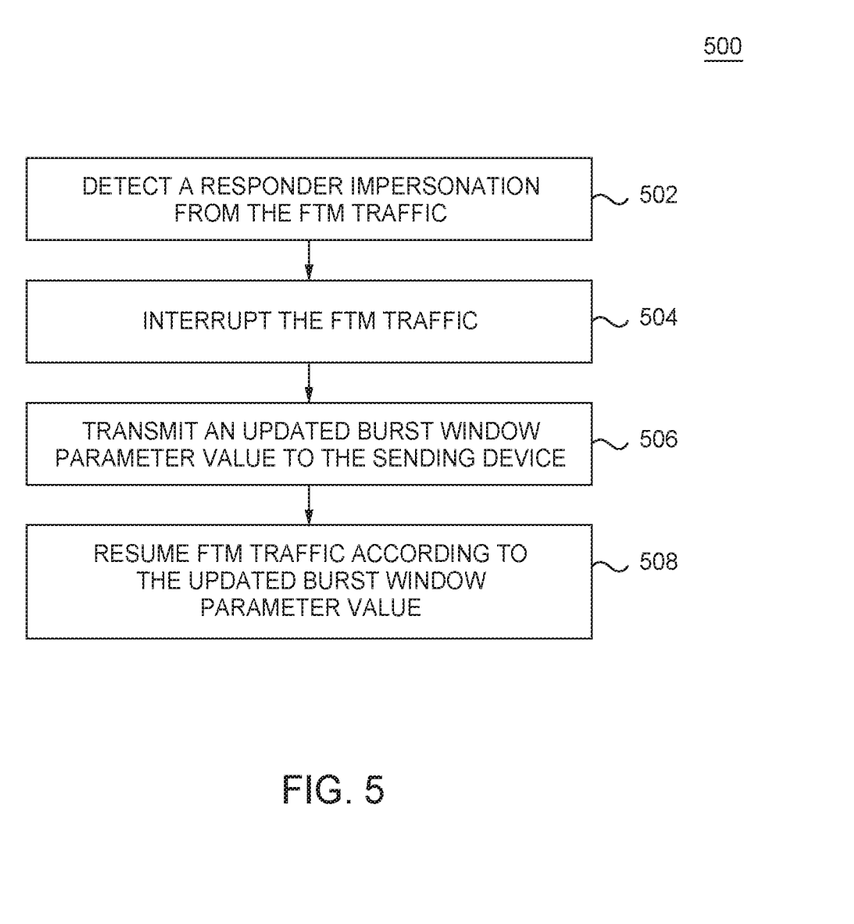
FIG. 5 is a method for responding to a malicious responding device in a network, according to one embodiment described herein.

FIG. 3 is a method for FTM security in a network, according to one embodiment described herein. For the purposes of discussion, the method 300 as well as methods in FIGS. 4 and 5 are described as being performed by the AP 110 with reference to FIGS. 1 and 2. In some examples, the AP 110 is embodied as the AP 600 described in relation to FIG. 6, which includes the learning module 150, the profiling module 155 and the filter module 160 which may perform the various operations described herein. The method 300 as well as methods described in relation to FIGS. 4 and 5 may also be performed by other APs in network 100 and the network controller 105.

Method 300 begins at block 302 where the AP 110 receives a request FTM frame from a sending device. For example, the station 120 may send the request frame 201 to the AP 110 to request the beginning of an FTM process or exchange. In some examples, the FTM request includes various request parameters set by the station 120 for the FTM exchange such as a burst window parameter value indicating a requested number of FTM exchanges for the station 120 to complete a ranging calculation among other parameters for a FTM exchange.

At block 304, the AP 110 records a plurality of parameters associated with FTM frames received at the receiving device from a sending device and FTM frames sent to the sending device from the receiving device. In some examples, this recording process is performed throughout the FTM exchange described in relation to blocks 304-354 and includes a plurality of parameters associated with the various FTM frames. For example, the AP 110 records, for the FTM request frame 201 from the station 120, an RSSI value, a frame timestamp, a ToD value, a ToA, a ToD error value, a ToA error value, and a burst window parameter value. The recorded values are then compiled and used to build a device profile and identify devices as described herein.

At block 306 the AP 110 initiates an iterative FTM burst sequence according to the burst window parameter value which specifies how many FTM frames should be exchanged as well as a time duration FTM exchange. For example, the burst window parameter value may indicate that the FTM exchange between the station 120 and the AP 110 should include 5 measuring pairs during a given time. At block 310, the AP 110 determines when the iterative FTM burst sequence is completed. In some examples, when the FTM burst sequence is ongoing, the method 300 proceeds to block 320. At block 320, the AP 110 transmits a responder FTM frame to the sending device. For example, the AP 110 transmits the FTM frame 206 which begins the FTM burst 205.

At block 322, the AP 110 records a ToD value for the responder FTM frame. For example, the AP 110 records t4 252 for the FTM frame 206. At block 324, the AP 110 receives an ACK frame from the sending device. For example, the AP 110 receives the ACK frame 207 from the station 120 in response to the FTM frame 206. In some examples, the ACK frame 207 includes the ToA for the FTM frame 206 (i.e. t5 255) at the station 120 among other reception and transmission parameters for the FTM frame 206 and ACK frame 207. At block 326, the AP 110 records a ToA value for the responder FTM frame at the sending device (i.e. t5 255), a ToD value for the ACK frame (i.e. t6 256), and a ToA value for the ACK frame at the receiving device (i.e. t7 257).

As the various parameters for the FTM exchange are compiled at the AP 110, the AP 110 may store the relevant recorded data for analysis. For example, at block 328, the AP 110 stores the recorded plurality of parameters as learning model input data for use by a machine learning or other learning model. For example, as described above, the profiling module 155 using ANN and LSTM compiles and uses the learning module input to determine one or more device profiles for stations in communication with the AP 110.

In some examples, after an initial set of transmissions the recorded parameters include enough relevant data to associate the sending device, the station 120, with a previously learned device profile. At block 330, the AP 110 determines when a device profile is available for the sending device. For example, the AP 110 determines from the learning model input data at least one learned device profile for one of the plurality of sending devices may be available. When a device profile is available, method 300 proceeds to block 340. When a device profile is not available at block 330, the method 300 proceeds back to block 310 to continue the burst sequence. For example, when further learning is needed to learn or identify various characteristics of the FTM exchange the AP 110 will continue the FTM exchange in order to record and compile more parameters associated with the FTM exchange.

When the burst sequence is complete at block 310, the method 300 proceeds to block 332, the AP 110 determines when a device profile is available for the sending device. In an example, where the AP 110 determines that a device profile is available, the method 300 continues to block 340. In another example, the profiling module 155 may need additional data points or further learning to accurately identify the sending device. In this example, the method 300 proceeds to block 334 to collect additional recorded parameters in future FTM exchanges and burst sequences.

When a device profile is available at either blocks 330 or 332 the method 300 proceeds to block 340, where the AP 110 identifies, using the recorded plurality of parameters, a device profile for the sending device comprising at least one of a chipset type, an operating system (OS), and OS traffic schedule variations. In some examples, the AP 110 may also identify the device profile for the sending device using the at least one learned device profile. For example, when a profile has been previously learned or when the AP 110 is provided a list of parameters to identify the device. The identification of the at least one of the chipset, OS, and OS traffic schedule variations by the OS schedule provides the AP 110 with enough information to filter out MITM attacks using a behavior filter.

At block 342, the AP 110 determines, using the device profile identified in block 330, a behavior filter for FTM traffic from the sending device. In some examples, the behavior filter is determined by the AP 110 by determining at least one expected traffic pattern for FTM traffic from the sending device based on the device profile at block 344 and determining a variation threshold for the at least one expected traffic pattern at block 346. For example, a device with a given chipset, OS, and OS scheduler would be expected to respond to FTM frames in a given pattern such as a given delay between ACK frames, etc. The behavior filter includes various expected behaviors for the station 120 based on the identified profile. In some examples, certain thresholds are also determined such as expected variations in RSSI from the station 120, variations in delays between messages, etc.

At block 348, the AP 110 determines when the device profile was identified (i.e. at block 330 during an FTM sequence). In an example, where the device profile was identified during an FTM sequence, at block 350 the AP 110 returns to the FTM burst sequence in order to complete the FTM exchange (e.g., the AP returns to complete the iterative process shown in blocks 320-328) according to the filter process in block 354. In an example, where the device profile is identified after completion of an FTM sequence (e.g., at block 334), the AP 110 at block 352 waits for additional FTM traffic and upon receiving the additional FTM traffic from the sending device proceeds to filter the FTM traffic at block 354.

In both examples, the method 300 proceeds to block 354, where the AP 110 filters FTM traffic from the sending device according to the behavior filter. In some examples, the behavior filter is applied along with a Kalman filter such as an EKF. In some examples, the FTM traffic subject to filtering includes any future FTM exchanges with the station 120. In some examples, such as when a device profile is identified at block 330 prior to a completion of a burst sequence, the remaining FTM transmissions between the station 120 and the AP 110 are also filtered using the behavior filter and thresholds. Filtering FTM traffic is described in more detail in relation to FIG. 4.

FIG. 4 is a method for FTM filtering in a network, according to one embodiment described herein. Method 400 begins at block 402 where the AP 110 receives FTM traffic marked as from the sending device. For example, the AP 110 receives FTM traffic marked or identifying itself as coming from the station 120.

At block 404, the AP 110 compares traffic parameters for the FTM traffic to the at least one expected traffic pattern and the variation threshold for the sending device. For example, upon receiving the ACK frame 209 in the FTM exchange 200, the AP 110 uses the recorded information known about the ACK frame 209 (e.g., ToD of FTM frame 208, ToA of FTM frame 208, ToD of ACK frame 209, ToA of ACK frame 209, etc.) to determine if the recorded information matches the expected values for FTM communication from the station 120 based on a device profile. In some examples, the filter is applied along with an EKF which also filters out frames based on additional parameters such as the RSSI of ACK frame 209.

At block 406, when the comparison at block 404 indicates the traffic parameters are outside of the variation threshold for the at least one expected traffic pattern, the AP at block 408 drops the FTM traffic marked as from the sending device. For example, for the ACK frame 211, the various parameters associated with the ACK frame 211 do not match the expected values from the behavior filter for the station 120 (since the ACK frame 211 is from the MITM station 130), thus the AP 110 drops the ACK frame 211 and does not respond to the MITM station 130. In some examples, when the AP 110 determines a MITM frame has been received, it alerts the network controller and/or other APs in the network 100 to warn of possible MITM attacks including any recorded or known parameters for the MITM devices.

At block 406, when the comparison at block 404 indicates the traffic parameters are within the variation threshold for the at least one expected traffic pattern, method 400 continues to block 410 where the AP 110 records a plurality of parameters associated with FTM frames of the FTM traffic marked as from the sending device and responds to the FTM frames at block 412. For example, upon receipt of the ACK frame 209, the various recorded parameters pass the behavior filter and are validated. The parameters are within the behavior filter and threshold and are recorded to help further aid the AP 110 including the profiling module 155 to identify similar devices and device profiles.

FIG. 5 is a method for responding to a malicious responding device in a network, according to one embodiment described herein. Method 500 begins at block 502 where the AP 110 detects a responder impersonation from the FTM traffic. For example, upon receiving ACK frame 213 from the station 120 which is in response to a MITM frame 212 from the MITM RSTA 140, the AP 110 determines from the ToD value for the FTM frame 212 (among other indicators) that the station 120 is responding to a MITM attack. In some examples, additional indicators may also be used to detect a MITM attack. For example, variations in stochasticity, (e.g. outlier standard deviation values) of the MITM ISTA or MITM RSTA's burst pattern in FTM exchanges when compared to the profiled RSTA's FTM burst pattern from genuine RSTA/AP's can indicate a MITM attack from the RSTA 140.

At block 504, the AP 110 interrupts the FTM traffic. For example, the AP 110 sends an interrupt, such as the FTM frame 214 to the station 120 to indicate the station 120 is responding to a MITM attacked. At block 506, the AP 110 transmits an updated burst window parameter value to the sending device. For example, upon determining an appropriate burst window and other parameters which may include a delay to prevent ongoing or future MITM attacks from the MITM RSTA 140, the AP 110 transmits the FTM frame 215 and resumes FTM traffic according to the updated burst window parameter value at block 508.

Figure 6:
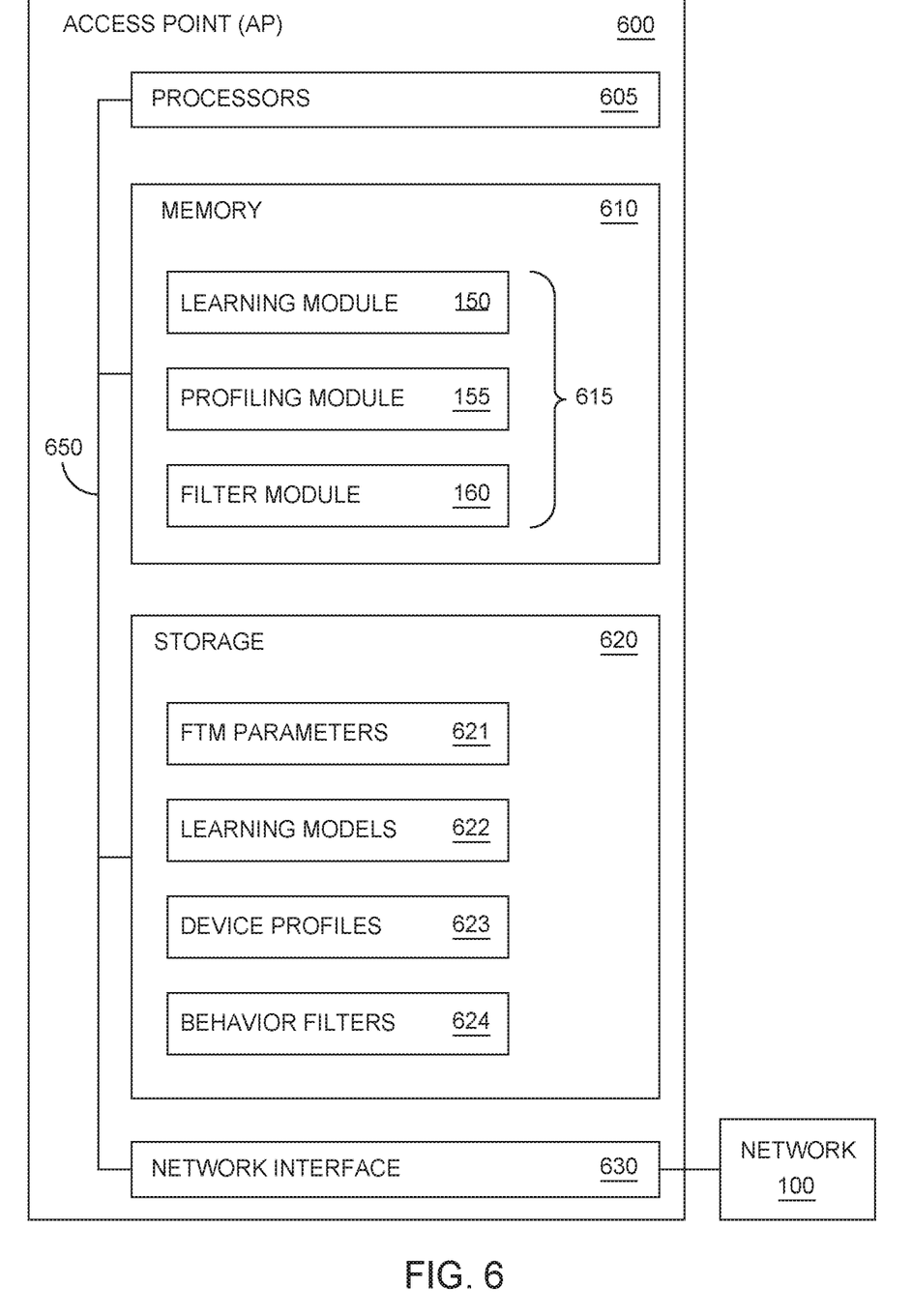
FIG. 6 is a block diagram of an access point, according to one embodiment described herein.

FIG. 6 is a block diagram of an AP 600, according to one embodiment described herein. The AP 600 is shown in the form of a general-purpose computing device, but may include a server and/or application executing on a cloud network. The AP 600 may be embodied as the AP 110 other neighboring APs as described herein. The components of the AP 600 may include, but are not limited to, one or more processing units or processors 605, a memory 610, a storage system 620, network interface 630 connecting the AP 600 to the network 100 and neighboring APs, and a bus 650 that couples various system components including the memory 610 and storage system 620 to processors 605 along with various input/output components (not shown). In other embodiments, the AP 600 is distributed and includes a plurality of discrete computing devices that are connected through wired or wireless networking.

Bus 650 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The AP 600 typically includes a variety of computer system readable media. Such media may be any available media that is accessible by the AP 600, and it includes both volatile and non-volatile media, removable and non-removable media.

Memory 610 can include computer system readable media in the form of volatile memory, such as random access memory (RAM) and/or cache memory. The AP 600 may further include other removable/non-removable, volatile/non-volatile computer system storage media. By way of example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 650 by one or more data media interfaces. As will be further depicted and described below, memory 610 may include at least one program product having a set (e.g., at least one) of program modules that are configured to carry out the functions of various embodiments described herein.

The AP 600 may further include other removable/non-removable, volatile/non-volatile computer system storage media. In some examples storage system 620 may be included as part of memory 610 and may typically provide a non-volatile memory for the networked computing devices, and may include one or more different storage elements such as Flash memory, a hard disk drive, a solid state drive, an optical storage device, and/or a magnetic storage device. For example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 650 by one or more data media interfaces. Storage system 620 may include media for a FTM parameters 621, learning models 622, device profiles 623, behavior profiles 624, and other information stored for access and use by the AP 600.

Memory 610 may include a plurality of modules 615 for performing various functions described herein. The modules 615 generally include program code that is executable by one or more of the processors 605. As shown, modules 615 include the learning module 150, the profiling module 155, and the filter module 160. The modules 615 may also interact with each other and storage system 620 to perform certain functions as described herein.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method comprising:
recording, at a receiving device, a plurality of parameters associated with fine timing measurement (FTM) frames exchanged between a sending device and the receiving device by:
  receiving a request FTM frame from the sending device;
  recording, for the request FTM frame from the sending device, a received signal strength indicator (RSSI) value, a frame timestamp, a time of departure (ToD) value, a time of arrival value (ToA), a ToD error value, a ToA error value, and a burst window parameter value; and
  performing an iterative FTM burst sequence according to the burst window parameter value;
identifying, using the recorded plurality of parameters, a device profile for the sending device comprising at least one of a chipset type, an operating system (OS), and OS traffic schedule variations;
determining, using the device profile, a behavior filter for FTM traffic from the sending device; and
filtering FTM traffic from the sending device according to the behavior filter.

2. The method of claim 1,
wherein performing an iterative FTM burst sequence according to the burst window parameter value comprises:
  transmitting a responder FTM frame to the sending device;
  recording a ToD value for the responder FTM frame;
  receiving an acknowledgement (ACK) frame from the sending device;
  recording a ToA value for the responder FTM frame at the sending device, a ToD value for the ACK frame, and a ToA value for the ACK frame at the receiving device; and
  repeating the iterative FTM burst sequence according to the burst window parameter value; and
storing the recorded plurality of parameters as learning model input data.

3. The method of claim 2, further comprising:
determining, using a long short-term Memory (LSTM) classifier and from the learning model input data at least one learned device profile for one of the plurality of sending devices; and
wherein identifying the device profile for the sending device further comprises:
  identifying the device profile for the sending device using the at least one learned device profile.

4. The method of claim 3, wherein the method further comprise:
during the performance an iterative FTM burst sequence, determining from the learning model input data when a device profile is available;
when the device profile is not available, continuing the iterative FTM burst sequence and recording additional parameters; and
when the device profile is available, filtering FTM traffic in the iterative FTM burst sequence from the sending device according to the behavior filter.

5. The method of claim 1, wherein determining the behavior filter for FTM traffic from the sending device comprises:

determining at least one expected traffic pattern for FTM traffic from the sending device based on the device profile; and determining a variation threshold for the at least one expected traffic pattern.

6. The method of claim 5, wherein filtering FTM traffic from the sending device according to the behavior filter further comprises:

receiving FTM traffic marked as from the sending device;

comparing traffic parameters for the FTM traffic to the at least one expected traffic pattern and the variation threshold for the sending device;

wherein when the comparison indicates the traffic parameters are outside of the variation threshold for the at least one expected traffic pattern, dropping the FTM traffic marked as from the sending device; and wherein when the comparison indicates the traffic parameters are within the variation threshold for the at least one expected traffic pattern:

recording a plurality of parameters associated with FTM frames of the FTM traffic marked as from the sending device; and responding to the FTM frames.

7. The method of claim 1, further comprising:

detecting a responder impersonation from the FTM traffic;

interrupting the FTM traffic;

transmitting an updated burst window parameter value to the sending device; and resuming FTM traffic according to the updated burst window parameter value.

8. A system comprising one or more computer processors and a memory containing a program which when executed by the computer processors performs an operation comprising:

recording, at a receiving device, a plurality of parameters associated with fine timing measurement (FTM) frames exchanged between a sending device and the receiving device by:

receiving a request FTM frame from the sending device;

recording, for the request FTM frame from the sending device, a received signal strength indicator (RSSI) value, a frame timestamp, a time of departure (ToD) value, a time of arrival value (ToA), a ToD error value, a ToA error value, and a burst window parameter value; and performing an iterative FTM burst sequence according to the burst window parameter value;

identifying, using the recorded plurality of parameters, a device profile for the sending device comprising at least one of a chipset type, an operating system (OS), and OS traffic schedule variations;

determining, using the device profile, a behavior filter for FTM traffic from the sending device; and filtering FTM traffic from the sending device according to the behavior filter.

9. The system of claim 8, wherein performing an iterative FTM burst sequence according to the burst window parameter value comprises:

transmitting a responder FTM frame to the sending device;

recording a ToD value for the responder FTM frame;

receiving an acknowledgement (ACK) frame from the sending device;

recording a ToA value for the responder FTM frame at the sending device, a ToD value for the ACK frame, and a ToA value for the ACK frame at the receiving device; and repeating the iterative FTM burst sequence according to the burst window parameter value; and storing the recorded plurality of parameters as learning model input data.

10. The system of claim 9, further comprising:

determining using a long short-term Memory (LSTM) classifier and from the learning model input data at least one learned device profile for one of the plurality of sending devices; and wherein identifying the device profile for the sending device further comprises:

identifying the device profile for the sending device using the at least one learned device profile.

11. The system of claim 10, wherein the operation further comprise:

during the performance an iterative FTM burst sequence, determining from the learning model input data when a device profile is available;

when the device profile is not available, continuing the iterative FTM burst sequence and recording additional parameters; and when the device profile is available, filtering FTM traffic in the iterative FTM burst sequence from the sending device according to the behavior filter.

12. The system of claim 8, wherein determining the behavior filter for FTM traffic from the sending device comprises:

determining at least one expected traffic pattern for FTM traffic from the sending device based on the device profile; and determining a variation threshold for the at least one expected traffic pattern.

13. The system of claim 12, wherein filtering FTM traffic from the sending device according to the behavior filter further comprises:

receiving FTM traffic marked as from the sending device;

comparing traffic parameters for the FTM traffic to the at least one expected traffic pattern and the variation threshold for the sending device;

wherein when the comparison indicates the traffic parameters are outside of the variation threshold for the at least one expected traffic pattern, dropping the FTM traffic marked as from the sending device; and wherein when the comparison indicates the traffic parameters are within the variation threshold for the at least one expected traffic pattern:

recording a plurality of parameters associated with FTM frames of the FTM traffic marked as from the sending device; and responding to the FTM frames.

14. The system of claim 8, wherein the operation further comprises:

detecting a responder impersonation from the FTM traffic;

interrupting the FTM traffic;

transmitting an updated burst window parameter value to the sending device; and resuming FTM traffic according to the updated burst window parameter value.

15. A computer program product comprising:
a non-transitory computer-readable storage medium having computer-readable program code embodied therewith, the computer-readable program code executable by one or more computer processors to perform an operation comprising:
  recording, at a receiving device, a plurality of parameters associated with fine timing measurement (FTM) frames exchanged between a sending device and the receiving device by:
    receiving a request FTM frame from the sending device;
    recording, for the request FTM frame from the sending device, a received signal strength indicator (RSSI) value, a frame timestamp, a time of departure (ToD) value, a time of arrival value (ToA), a ToD error value, a ToA error value, and a burst window parameter value; and
    performing an iterative FTM burst sequence according to the burst window parameter value;
  identifying, using the recorded plurality of parameters, a device profile for the sending device comprising at least one of a chipset type, an operating system (OS), and OS traffic schedule variations;
  determining, using the device profile, a behavior filter for FTM traffic from the sending device; and
  filtering FTM traffic from the sending device according to the behavior filter.

16. The computer program product of claim 15,
wherein performing an iterative FTM burst sequence according to the burst window parameter value comprises:
  transmitting a responder FTM frame to the sending device;
  recording a ToD value for the responder FTM frame;
  receiving an acknowledgement (ACK) frame from the sending device;
  recording a ToA value for the responder FTM frame at the sending device, a ToD value for the ACK frame, and a ToA value for the ACK frame at the receiving device; and
  repeating the iterative FTM burst sequence according to the burst window parameter value; and
storing the recorded plurality of parameters as learning model input data.

17. The computer program product of claim 16, further comprising:
  determining using a long short-term Memory (LSTM) classifier and from the learning model input data at least one learned device profile for one of the plurality of sending devices; and
  wherein identifying the device profile for the sending device further comprises:
    identifying the device profile for the sending device using the at least one learned device profile.

18. The computer program product of claim 17, wherein the operation further comprises:
  during the performance an iterative FTM burst sequence, determining from the learning model input data when a device profile is available;
  when the device profile is not available, continuing the iterative FTM burst sequence and recording additional parameters; and
  when the device profile is available, filtering FTM traffic in the iterative FTM burst sequence from the sending device according to the behavior filter.

19. The computer program product of claim 15, wherein determining the behavior filter for FTM traffic from the sending device comprises:
  determining at least one expected traffic pattern for FTM traffic from the sending device based on the device profile; and
  determining a variation threshold for the at least one expected traffic pattern.

20. The computer program product of claim 19, wherein filtering FTM traffic from the sending device according to the behavior filter further comprises:
  receiving FTM traffic marked as from the sending device;
  comparing traffic parameters for the FTM traffic to the at least one expected traffic pattern and the variation threshold for the sending device;
  wherein when the comparison indicates the traffic parameters are outside of the variation threshold for the at least one expected traffic pattern, dropping the FTM traffic marked as from the sending device; and
  wherein when the comparison indicates the traffic parameters are within the variation threshold for the at least one expected traffic pattern:
    recording a plurality of parameters associated with FTM frames of the FTM traffic marked as from the sending device; and
    responding to the FTM frames.

* * * * *